United States Patent

[11] 3,585,611

[72] Inventors Issai Lefkowitz
Princeton Junction, N.J.;
Godfrey S. Pawley, Egaa, Denmark;
William W. Cochran, Edinburgh, Scotland;
Roger A. Cowley; Gerald Dolling, both of
Deep River, Ontario, Canada

[21] Appl. No. 881,355
[22] Filed Dec. 2, 1969
[45] Patented June 15, 1971

[73] Assignees The United States of America as represented by the Secretary of the Army by said Lefkowitz;
Atomic Energy of Canada Limited Ottawa, Ontario, Canada, by said Cowley, Cochran, Pawley and Dolling Continuation-in-part of application Ser. No. 749,493, Aug. 1, 1968, now abandoned.

[54] FERROELECTRIC SEMICONDUCTOR MEMORY ELEMENT
10 Claims, 2 Drawing Figs.

[52] U.S. Cl. ........................................ 340/173, 307/238, 307/279, 340/173
[51] Int. Cl. ........................................ G11c 11/22, G11c 11/36
[50] Field of Search ........................................ 317/235, 21.1; 307/238, 279; 340/173 SS, 2

[56] References Cited

UNITED STATES PATENTS

| | | | |
|---|---|---|---|
| 2,791,760 | 5/1957 | Ross | 340/173 |
| 3,126,509 | 3/1964 | Pulvari | 340/173.2 |
| 3,307,089 | 2/1967 | Yamashita | 317/235 |

*Primary Examiner*—Terrell W. Fears
*Attorneys*—Harry M. Saragovitz, Edward J. Kelly, Herbert Berl and Stanley Dubroff

ABSTRACT: A memory element comprising a switchable ferroelectric material which is also a small band gap semiconductor, having sampling bits associated therewith. The surfaces of this material are suitably doped by selective diffusion to produce P-N semiconductor gates on the surfaces. When a question pulse is applied to the semiconducting gates, a current will flow in response to said pulse only when the threshold voltage or coercive field of the ferroelectric is exceeded to thus permit the bit being sampled to reveal the state of polarization of said ferroelectric.

INVENTORS,
ISSAI LEFKOWITZ
ROGER A. COWLEY
GERALD DOLLING
WILLIAM W. COCHRAN
GODFREY S. PAWLEY
By: Harry M. Saragovitz,
Edward J. Kelly, Herbert Berl & S. Dubroff
ATTORNEYS.

FERROELECTRIC SEMICONDUCTOR MEMORY ELEMENT

This application is a continuation-in-part of the now abandoned application U.S. Ser. No. 749,493, filed Aug. 1, 1968 entitled "Ferroelectric Semiconductor Memory Element."

The invention described herein may be manufactured, used and licensed by or for the Government for governmental purposes without the payment to us of any royalty thereon.

This invention relates to ferroelectrics and more particularly concerns improved ferroelectric semiconductor memory element.

As is well known, the relation between polarization and applied electric field of a ferroelectric material can be represented by a hysteresis loop. The spontaneous polarization inherent in ferroelectric materials may be reversed by means of an electric field. If a crystal of ferroelectric material, such as barium titanate, is repeatedly pulsed, a fatigue or decay effect is observed permitting the crystal to switch notwithstanding the fact that only small pulses not exceeding the coercive field or threshold voltage of the crystal is fed thereinto.

This undesirable decay effect results in the gradual reduction of the charge switched or loss of response after a few million cycles of switching. This effect is of great importance in the field of possible application of ferroelectric crystals as matrix memories for digital storage in computer and switching systems. This difficulty has plagued the application of ferroelectric materials and memory elements in the past.

In an attempt to solve this problem, Pulvari in U.S. Pat. No. 3,126,509 sandwiches a ferroelectric material with a thin metal layer joined to a semiconductive material. However, the technology of applying metal layers and semiconductive films has not been entirely successful.

Accordingly, it is an object of this invention to provide an improved ferroelectric memory element.

Another object of the invention is to provide such a memory element which will switch in response to question pulses only when said pulses are of such magnitude that the coercive field or threshold voltage for the particular ferroelectric is reached.

Yet another object of the invention is to provide such a memory element which will have information densities considerably higher than prior art memory elements, as well as high speed access time.

Figure 1:
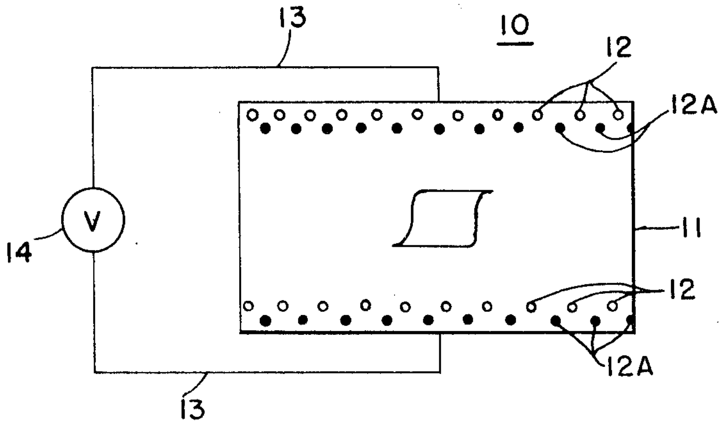
Figure 2:
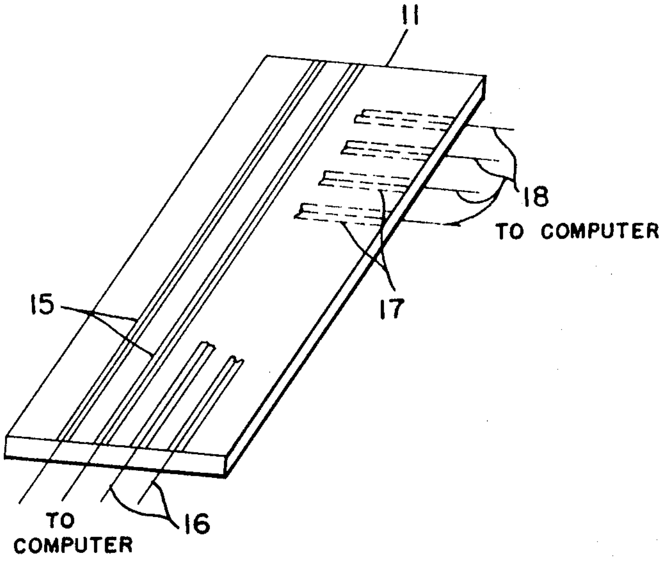

Further objects and advantages of our invention will become apparent to those skilled in this art from the appended claims and following description made in conjunction with the accompanying drawings wherein:

FIG. 1 is a partially sectioned view of an embodiment of a memory element of our inventive device; and FIG. 2 is an enlarged perspective view of the ferroelectric element of FIG. 1, including information bit sampling apparatus attached thereto, all comprising a portion of the memory element of our inventive device.

In accordance with the above-mentioned objects, we have discovered that if the ferroelectric material used is also intrinsically a small band gap semiconductor material, a pair of similar P-N conducting gates can be diffused directly into the surfaces of the material. These gates will provide a means for discriminating against unwanted noise pulses, so that only the information sampling pulse exceeding the coercive field will be introduced into the polar ferroelectric element.

More specifically, we have discovered that the material tin telluride/germanium telluride 70 percent/30 percent is both a ferroelectric and a small band gap semiconductive material. Furthermore, some wide band gap semiconducting ferroelectric material can be, with the proper processing, made into a small band gap semiconducting ferroelectric. The surfaces of the semiconducting ferroelectric material may be suitably doped by selective diffusion to produce semiconductors of appropriate geometry and doping such that no switch pulse will be transferred except over the threshold field of the ferroelectric resulting in sampling of the equivalent bit only above the threshold field. The required state of the polarization can be reinforced by redundancy circuits. This arrangement of the solid itself, thus overcomes the aging and threshold difficulties usually encountered with these materials.

Referring now to the drawings, there is shown our inventive memory element 10 which comprises a semiconducting ferroelectric element 11 with suitable dopants 12 and **12*a*** diffused into the surfaces to produce P-N semiconducting gates. These semiconducting gates are actually diodes which are designed to have a back or reverse breakdown voltage level slightly below the coercive or threshold field of the ferroelectric. As is well known in the diode art, semiconductor P-N diodes conduct usually in one direction but restrain flow in the opposite direction. However, when a reverse field or bias becomes sufficiently large to remove valence electrons from their covalent bonds there occurs avalanche or Zener breakdown such that current flow is achieved in the opposite direction. It is this breakdown level that must be overcome before a question or switch pulse is permitted to pass in accordance with this invention. Other switch pulses, as those due to noise for example, are below the breakdown level and are therefore not passed.

Electric conductors 13–13 lead from the semiconducting gates to an area marked V, designated by the numeral 14, wherein positive or negative pulse voltages will be applied thereat. The ferroelectric material will be provided with bits as shown in FIG. 2 wherein a plurality of spaced parallel electrically conducting strips 15, preferably of silver, but not limited thereto, are deposited on ferroelectric 11 by means well known. An electrically conducting wire 16 is adhered to each strip 15, as shown in the drawing. The wire may be platinum, for example, although any good conductor will do, and will normally be less than 0.1 mm. in diameter, or approximately the same width as strips 15, enabling through microminiaturization techniques, the successful fabrication of our memory elements having upwardly of about 400 information bits to an inch of ferroelectric surface.

The opposite surface of ferroelectric 11 will contain strips 17 and wires 18, identical in number, size, shape, and composition to strips 15 and wires 16 respectively, but will be disposed normal thereto. Wires 16 and 18 will be connected to a computer associated with our memory elements by means commonly known in the computer art.

The preferred semiconducting ferroelectric material for use in this invention is a solid solution of germanium telluride and tin telluride having an atomic percentage of 30 percent germanium telluride. This material has been found to be not only ferroelectric but also a small band gap semiconductor. To achieve the proper semiconducting gates on the surfaces of the ferroelectric, one surface must have a P-N type diode while the other surface must have the opposite bias. For the germanium telluride/tin telluride material, the N-type semiconductor does not exist in the bulk material but it does exist in the space charge region which appears only as a thin film on the surface of the material. A P-type region may be induced by the diffusion of excess tellurium into the surface of the N-type space charge region. An opposite junction is achieved on the other surface of the material by diffusing excess tellurium thereby forming a P-type region. Now by applying a pulsed field of appropriate polarity, a space charge N-type region may be formed on the surface of the P-type region. A ferroelectric memory device of unitary construction is thereby made by this procedure. A discussion of space charge regions in semiconductor materials may be found in chapter 4 of "Semiconductor Surfaces" by Many, Goldstein and Grover, John Wiley & Sons, Inc., New York, 1965.

Any ferroelectric material which can be made into a small band gap semiconductor may be used as the base material for this device. Material made from certain elements selected from groups **4*a* and 6*a* of the periodic table, preferably elements having atomic weights greater than 16, such as silicon, germanium, tin and lead from group 4*a*, and sulfur, selenium, tellurium and polonium from group 6*a***, show the greatest prospects of having these characteristics.

It has also been found that barium titanate may be modified in order to make it into small band gap semiconductive material as well as a ferroelectric. This is done by heating single crystals of barium titanate for four hours at 700° C, in a potassium atmosphere. Diode gates may then be applied to the barium titanate crystals by the point contact method as is well known in the semiconductor art.

In operation, if a positive question pulse of a voltage below the coercive field or threshold voltage is fed into semiconducting gate 12 blocking the voltage since it is not strong enough to overcome the back end of the P-N junction or to reverse the polarization state of the ferroelectric. Even if millions of these pulse voltages of insufficient magnitude are repeatedly pulsed into the system, they will be blocked and no switching will result. However, when a question pulse of a voltage sufficient to reach or exceed the coercive field is fed into the system, a current flow will result to permit the bit being sampled to reveal the state of polarization of the ferroelectric 11. Standard redundancy circuits may be used to reinforce the polarization state of the material.

It is apparent from the foregoing description that we have provided a ferroelectric semiconductor storage device having information densities considerably higher than memory elements heretofore available, with high speed potential and built-in redundancy circuits which overcome the present difficulties in applying ferroelectrics as memory elements. Further, the decay effect, which has plagued the application of ferroelectric materials as memory elements in the past, is not existent in our device. Also the problems which have been found in the applications of semiconductor films to ferroelectric materials have been obviated by the present invention. Our device is of special interest and tremendous impact in environments of changing magnetic fields as encountered by missiles and the like in flight.

We wish it to be understood that we do not desire to be limited to the exact details of construction shown and described, for obvious modifications will occur to a person skilled in the art.

We claim:

1. A ferroelectric semiconductor storage device comprising a ferroelectric material having small band gap semiconducting properties, wherein the surfaces of said material have been suitably doped to produce semiconductor diodes integral with said surface, said diodes acting as semiconducting gates.

2. The device of claim 1 further characterized by said semiconductor diodes having electrical conductors attached thereto for applying a voltage thereacross.

3. The device of claim 2 wherein said ferroelectric material comprises at least two elements, each of said elements having an atomic weight greater than 16, at least one of said elements being selected from the 4*a* group of the periodic table and the remainder of said elements being selected from the 6*a* group of the periodic table.

4. The device of claim 3 further characterized by said ferroelectric material consisting of a solid solution of germanium telluride and tin telluride, said germanium telluride comprising about 30 atomic percent of said solid solution.

5. The device of claim 2 wherein said ferroelectric material comprises barium titanate which has been modified by holding at a high temperature in a potassium rich atmosphere in order to impart small band gap semiconducting characteristics thereto.

6. The device of claim 4 further characterized by said ferroelectric material having means connected thereto for communication with a computer.

7. The device of claim 5 further characterized by said ferroelectric material having means connected thereto for communication with a computer.

8. The device as described in claim 6 wherein said means comprises an equal number of spaced parallel electrical conductors disposed in each face of said ferroelectric contacting said semiconductor diodes, said spaced parallel electrical conductors on one of said faces being disposed at right angles to said spaced parallel electrical conductors on the other or said faces, and each of said spaced parallel electrical conductors being mounted on individual electrical conducting strips adhering to said ferroelectric.

9. The device as described in claim 7 wherein said means comprises an equal number of spaced parallel electrical conductors disposed in each face of said ferroelectric contacting said semiconductor diodes, said spaced parallel electrical conductors on one of said faces being disposed at right angles to said spaced parallel electrical conductors on the other of said faces, and each of said spaced parallel electrical conductors being mounted on individual electrical conducting strips adhering to said ferroelectric.

10. In a computer memory element storage device having a polarizable ferroelectric body with opposite one-way potential gates on both surfaces of said body, and conductor means connected to said gates for applying a voltage thereacross ad communication means connected to said gates for communication with a computer, wherein the improvement comprises the use of a single material as said ferroelectric body which exhibits both ferroelectric and small band gap semiconducting properties and which has surfaces which have been suitably doped to produce semiconductor diodes acting as said one-way potential gates.